United States Patent [19]

Garman et al.

[11] Patent Number: 4,993,736
[45] Date of Patent: Feb. 19, 1991

[54] WHEELCHAIR APPARATUS

[75] Inventors: David E. T. Garman; Richard M. Rimington, both of Powys, Wales

[73] Assignee: Mangar Aids Limited, Powys, Wales

[21] Appl. No.: 411,395

[22] Filed: Sep. 22, 1989

[30] Foreign Application Priority Data

Sep. 29, 1988 [GB] United Kingdom ............... 8822894
Jan. 19, 1989 [GB] United Kingdom ............... 8901157

[51] Int. Cl.⁵ .............................................. B60N 2/16
[52] U.S. Cl. .............................. 280/304.1; 280/250.1; 297/DIG. 4; 297/DIG. 8
[58] Field of Search .................... 280/250.1, 304.1; 180/907; 297/DIG. 3, DIG. 4, DIG. 8, 345

[56] References Cited

U.S. PATENT DOCUMENTS

| 3,295,621 | 1/1967 | Deeley et al. | 297/345 |
| 4,362,311 | 12/1982 | Bergman | 297/DIG. 4 |
| 4,538,854 | 9/1985 | Wilson | 297/DIG. 8 |
| 4,862,997 | 9/1989 | Eberle | 297/345 |

FOREIGN PATENT DOCUMENTS

| 3119867 | 12/1982 | Fed. Rep. of Germany ... 297/DIG. 8 |
| 2097250 | 11/1982 | United Kingdom . |
| 2110527 | 6/1983 | United Kingdom . |

Primary Examiner—Richard A. Bertsch
Assistant Examiner—Mitchell Bompey
Attorney, Agent, or Firm—Neil F. Markva

[57] ABSTRACT

Wheelchair apparatus which is manually separable into four main units namely a lifting device, a seat unit, a wheeled chassis and a portable battery/compressor unit, of which the device and unit can be employed as static lifting apparatus, e.g. a bath-lift, when the unit and the chassis are detached; and the chassis has hand operated wheel-brakes and an automatic actuating mechanism to apply the brakes when the seat is raised.

11 Claims, 8 Drawing Sheets

WHEELCHAIR APPARATUS

FIELD OF THE INVENTION

This invention concerns improvements in or relating to wheelchairs and like apparatus for supporting persons, of a kind comprising a wheeled chassis, having a lifting device to raise and lower a seat, and, optionally comprising a backrest, and supports for limbs such as an armrest, legrest or footrest.

BACKGROUND OF THE INVENTION

Wheelchairs are known which comprise power operated lifting devices for adjusting the height of a seat of the wheelchair, to enable a seated person to be raised or lowered. However, such wheelchairs are of restricted utility, because of their size and complexity, and are expensive.

Lifting apparatus is disclosed in GB-A No. 2166415; and primarily comprises an inflatable bellows, disposed between a base and a platform which are mechanically linked by a stabilizing mechanism (contained in the bellows) to keep the platform parallel with the base. The apparatus is intended primarily for use in a bath, and for this purpose the base is provided with suckers. Although the base may instead be provided with castors or wheels, instead of the suckers, to permit mobile use of the apparatus, such use is restricted and the apparatus is not a satisfactory substitute for a wheelchair.

The specification also discloses the possibility that the base could form part of a wheelchair, trolley or vehicle. Thus the apparatus could be integrally constructed into a mobile unit such as a wheelchair instead of one of the known forms of power-operated lifting devices.

However, the problems of cost and apparatus storage and transportation are still considerable for those users who need both lifting apparatus for use in a bath and a wheelchair with an elevating seat.

SUMMARY OF THE INVENTION

To reduce or avoid such problems, the present invention firstly provides wheelchair apparatus comprising a wheeled chassis having a lifting device to raise and lower a seat, and characterized in that the lifting device is releasable from the chassis by actuation of a locking mechanism, is constructed for use as a static lifting unit e.g. in a bath independently of the wheeled chassis, and provides a platform upon which a person may be seated so as to be liftable by the lifting device.

The seat preferably comprises a carrier frame which is releasably secured to and supported on said platform, provides armrest mountings and leg support mountings, and provides location for a seat member such as a cushion.

The chassis preferably provides mountings upon which the base of the lifting device is releasably secured by a manually actuable locking mechanism; and preferably provides a compartment or other support for an air pump unit to supply air under pressure to the lifting device. The air pump unit is preferably provided with a battery or electrical storage cell to form a portable unit for use with the lifting device when the latter is removed from the chassis.

The lifting device is preferably in the form of lifting apparatus of the kind disclosed in GB-A No. 2166415A.

The carrier frame preferably slidably engages formations on lateral margins of the platform, and preferably has manually operable retaining means to retain the frame in position on the platform. The armrest mountings preferably permit removal of armrests located thereon.

The apparatus preferably includes at least one flank panel locatable on either of said formations, when the carrier frame is removed, to provide a hinged extension of the platform. The carrier frame or the chassis preferably provides stowage for the flank panel or panels.

The leg-support may be in the form of a foot-rest member or members which are pivotal between in-use and out-of-use positions and which are releasably supported by the leg-support mountings. Alternatively, the legsupport may be of an automatically inclining form pivotally supported by the leg-support mountings on the carrier frame and by further mountings on the chassis. A form of suitable leg support is disclosed in our copending application No. 8811654 (GB No. 2207042A).

The seat member preferably comprises a panel to support a seat cushion above the top surface of the platform; or the carrier frame may have a wedge member to provide inclined support for a seat cushion.

The chassis and carrier frame are preferably interconnectable for transfer and storage when the lifting device is removed; and the wheels, or at least a main pair of the wheels, are preferably detachable for being laid flat upon the chassis or carrier frame.

There are further problems with wheelchair apparatus which comprises a wheeled chassis carrying a lifting device to raise and lower a seat of the apparatus. When such apparatus is employed to raise a user by more than a few centimeters, the risk of a user being able to topple the apparatus is increased because of the substantial increase in the height of the overall center of gravity, and other risks arise, e.g. loss of control, if the user is raised to a level at which the user can only reach the main wheels with difficulty. Such risks have, in some circumstances, served to limit the amount of lift which can be utilized.

To enable such risks to be reduced, the present invention secondly provides wheelchair apparatus comprising a seat, a wheeled chassis having a lifting device to raise and lower a seat, and characterized in that the chassis is provided with braking apparatus comprising at least one wheel brake and an automatic actuating mechanism responsive to the seat being raised to apply said wheel brake.

The braking apparatus is preferably also actuable via a manually actuable control mechanism.

The automatic actuating mechanism is preferably arranged to apply or hold on the wheel brake while the seat is raised irrespective of any manual operation or attempted operation of the control mechanism.

The automatic actuating mechanism is preferably arranged to be uncoupled, negated or released by an attendant or other operative, to permit the apparatus to be moved while the seat is elevated.

The automatic actuating mechanism may act via the manually actuable control mechanism; and preferably comprises a member which is releasably connected to a vertically movable part of the seat or lifting device. Said member is preferably flexible and mounted on a winding drum for retraction by the drum when the seat is lowered or when the member disconnected from the seat or lifting device. The drum is preferably mounted on the chassis, and preferably carries a pawl which moves to engage a wheel brake operating member as said flexible member is drawn from the drum.

BRIEF DESCRIPTION OF DRAWINGS

The invention also provides and includes a wheelchair apparatus or chassis provided with any novel feature, device or construction disclosed herein or in the accompanying drawings.

Embodiments of the invention are described, by way of example, with reference to the accompanying drawings, wherein.

DETAILED DESCRIPTION OF THE INVENTION

The wheelchair apparatus primarily comprises four individual and separable units, namely a lifting device 10, a carrier frame 11 mounted on the lifting device 10, a chassis 12 supporting the lifting device 10 and a compressor and battery unit 13 located in a rearwardly opening compartment or reception space 14 in the chassis and releasably connected to the device 10 by a tube 15; together with fittings including armrests 19, a leg-support 16, a backrest 17, a seat 18 and a control handset 13A.

The compartment is large enough to contain the flank panels 10A employed with the lifting device when the latter, after removal from the chassis and carrier frame, is employed as a bath-lift.

In this embodiment the device 10 and backrest 17 are generally as described in specification No. GB-A No. 2166415, and the unit 13 and control handset 13A are generally as described in our copending specification No. GB-A No. 2210411; and the entire contents of these specifications are incorporated herein by reference.

Figures 7, 13, 14:
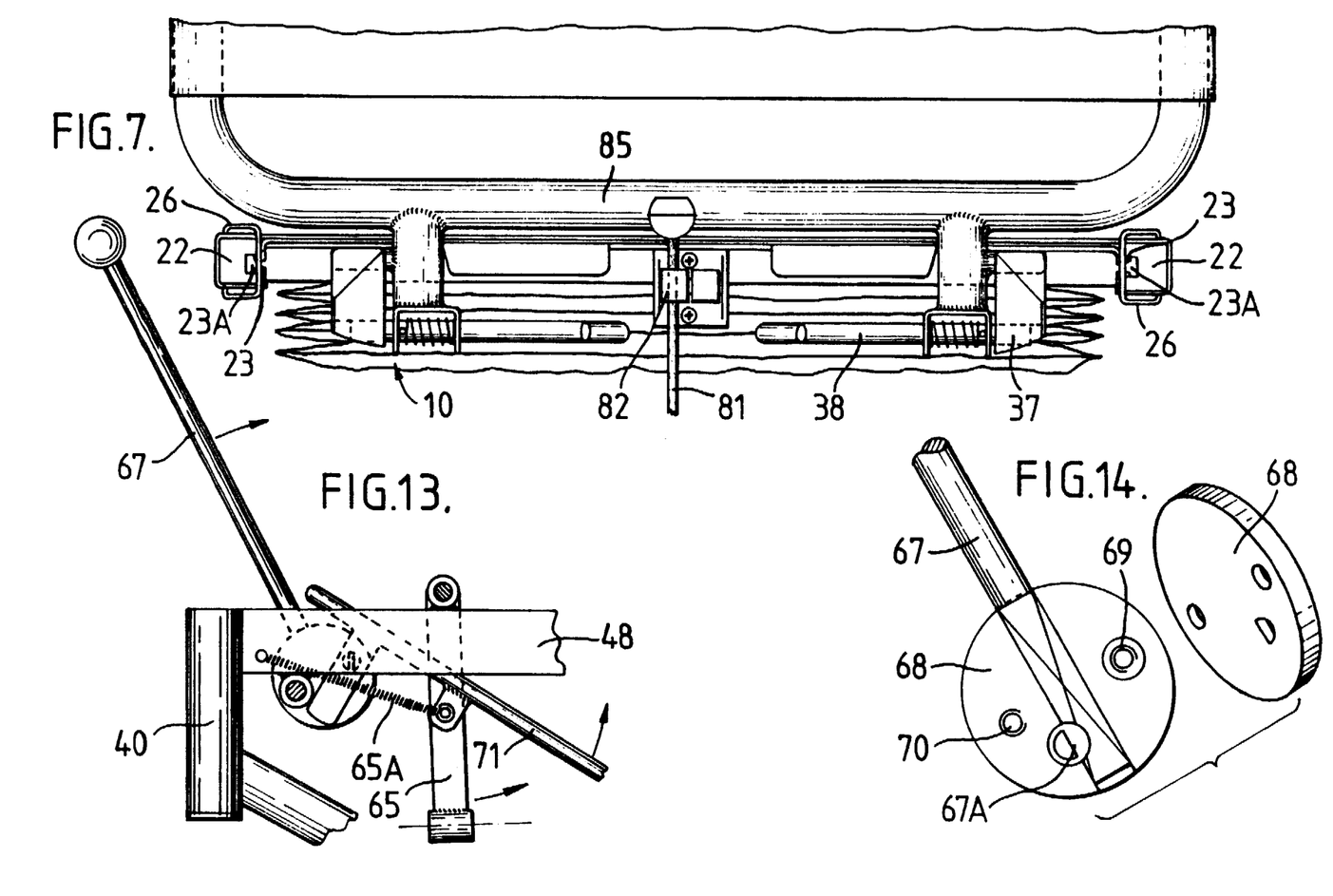
FIG. 7 is a fragmentary view of the rear of the carrier frame and parts of the seat and backrest.
FIG. 13 is a fragmentary view showing further detail of the braking mechanism.
FIG. 14 is a fragmentary view of another embodiment of the braking mechanism for the apparatus of the invention.

The carrier frame 11 provides mountings 20 in which the armrests 19 are releasably secured; mountings 21 in which the leg-support 16 is telescopically and releasably supported; brackets 22 providing oppositely directed channels 23 in which elongate formations 23A (e.g. of T-shaped cross-section as shown in FIG. 7) of the lateral margins of the platform 24 of the device 10 engage slidably; hooked stops 25 at the front to abut the front end of the platform; and manually displaceable spring retaining clips 26 to releasably engage the rear of the platform. The frame 11 serves also as a locating surround for a wedge-shaped seat member 27 which extends to overlie a front cross-member 28 of the frame 11, and rests on the platform to support a removable seat cushion 30 in a position in which it inclines forwardly relative to the platform.

The backrest 17 is attached releasably to mountings 37 on the rear of the platform by spring-loaded plunger bolts 38, and the upper part of the backrest is extended to provide a handlebar 39, for an assistant or helper.

The chassis 12 provides castor mountings 40 for small front castor wheels 41; quick release rear axle mountings 42 for a pair of large rear wheels 43 having hand rims 44; four pads 45 to support center portions of the suckers 31 of the device 10 and four abutments 45A to locate or support the base 32 of the device 10, together with a pair of top flanged locking levers 46 actuable by a manually actuable lever 47 and an over-center mechanism 46A (FIGS. 8 and 9) to lock the base 32 onto an upper frame portion 48 of the chassis; and a lower frame portion 49 projecting rearwards to serve as a foot-bar for a helper to tread on to tilt the wheelchair. The compartment or reception space 14 is disposed between the frame portions 48 and 49.

The leg support 16 includes two foot rests 33 carried on pivot arms 34 so as to be pivotable upwards, from the positions illustrated, to out-of-use positions; and the arms 34 are mounted on a member 35 engaged telescopically in lower portions 36 of the mountings.

Figure 1:
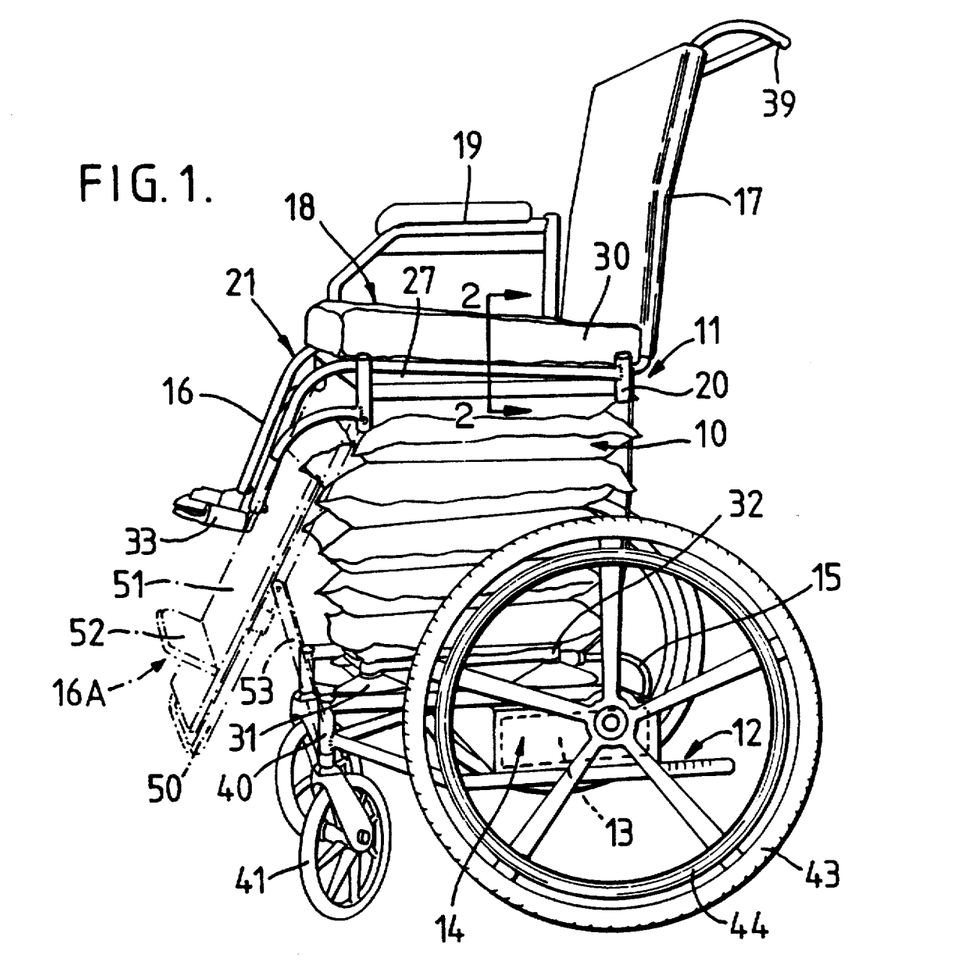
FIG. 1 is a perspective view of the apparatus of the invention in a raised condition with some parts omitted for clarity.
Figure 2:
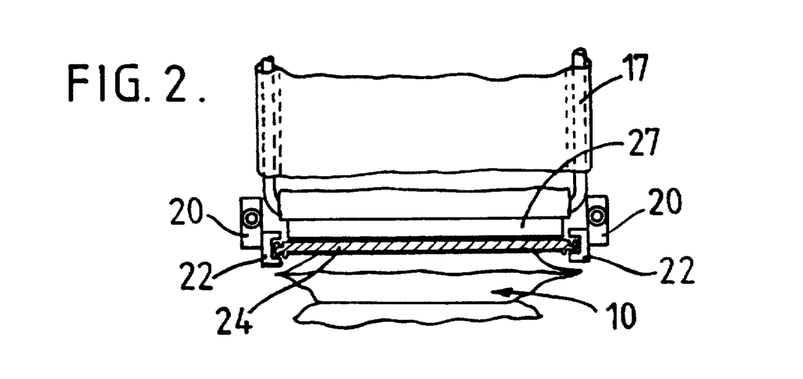
FIG. 2 is a fragmentary sectional view on the line A—A in FIG. 1.
Figure 3:
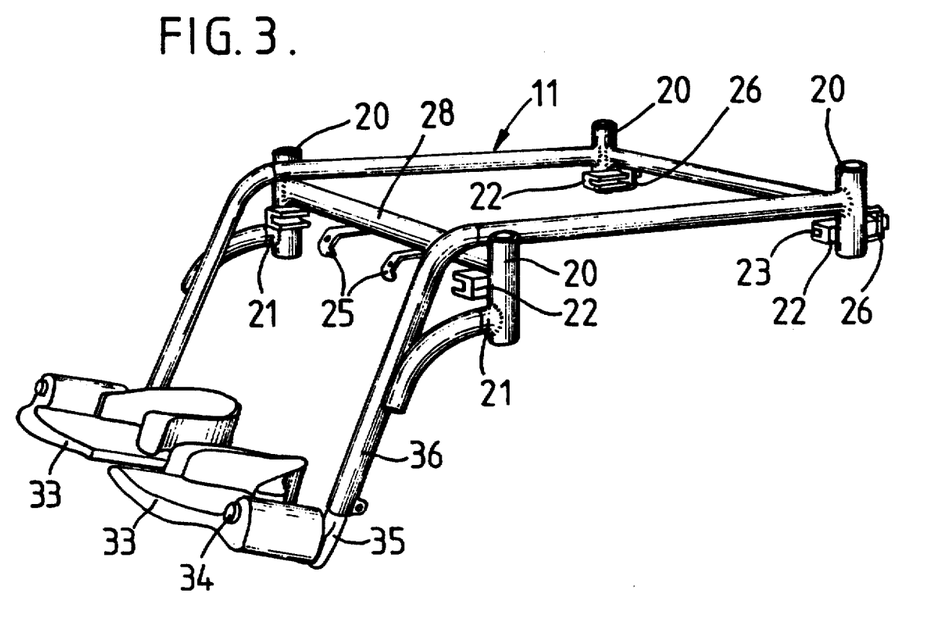
FIG. 3 is a simplified perspective view of a carrier frame of the apparatus of FIG. 1 with some parts omitted.
Figure 4:
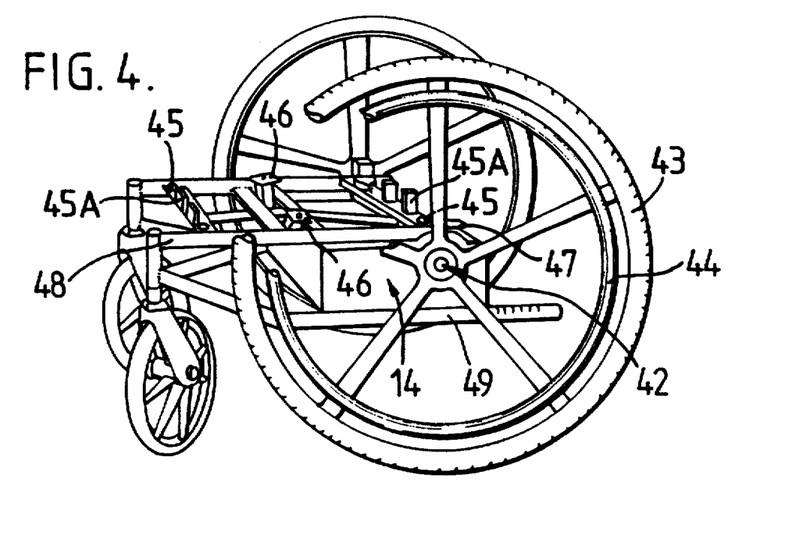
FIG. 4 is a simplified perspective view of a chassis of the apparatus of FIG. 1 with some parts omitted.

Referring to the basic form shown in FIGS. 1 AND 3, these lower portions 36 may be detachable to permit a pivotable leg-support 16A to be fitted as indicated in broken lines in FIG. 1. The support 16A comprises a frame 50 pivotally hung upon the mountings 21; a leg panel 51 mounted on the frame 50 to be releasable for sliding adjustment of the position of a footrest 52 relative to the seat; and a linkage 53 pivotally interconnected between the chassis and the frame 50, to swing the frame 50 upwards relative to the seat as the latter is lowered. A leg support of the kind disclosed in specification No. GB-A No. 2207042 (which is incorporated herein by reference) may be substituted for the support 16A.

Figure 5:
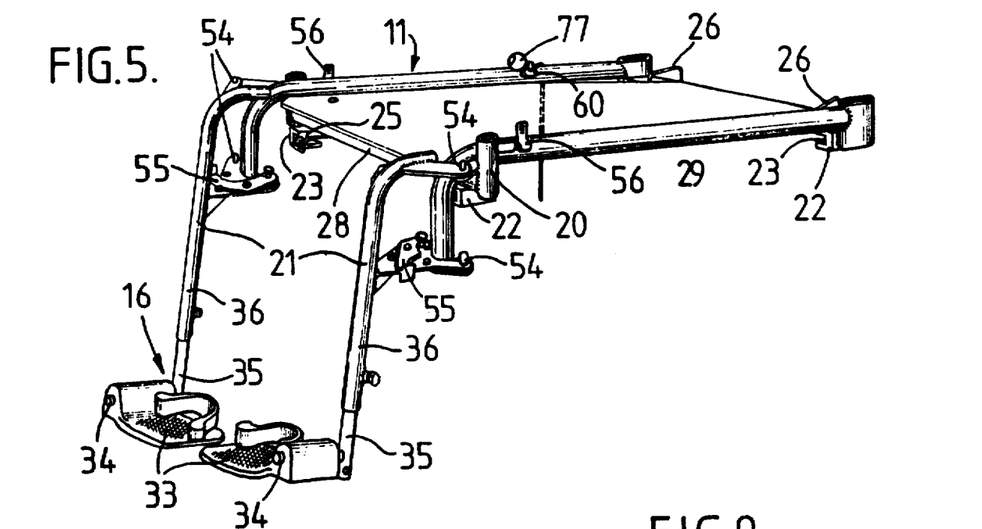
FIG. 5 is a perspective view of another embodiment of a carrier frame for the apparatus of the invention.

Alternatively, as shown in FIG. 5, the lower portions 36 may be pivotally and detachably mounted on pivots 54 provided on the frame 11; and have manually operable catches 55 to lock the legrests in the working position shown in the drawings. When the catches are released the legrests can be swung outwards clear of the front of the seat, and, if desired, lifted off the pivots 54 and removed from the apparatus. FIG. 5 also shows plunger catches 56 for retaining the armrests 19 in the sockets 20; a simple seat panel 29 (instead of the wedge-shaped seat member 27) to support a wedge-shaped form of the cushion; and a retaining hook 60.

Figure 6:
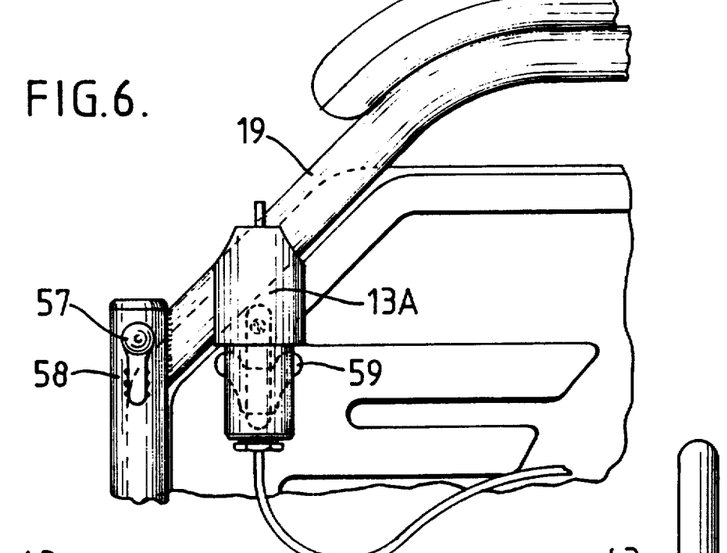
FIG. 6 is a fragmentary view of an armrest in side elevation with a control device.

FIG. 6 shows the front part of one armrest 19 in detail, to reveal a further plunger catch 57 for retaining a tray or table support in a socket 58 provided by each armrest, and a mounting 59 into which the handset 13A clips.

Figure 11:
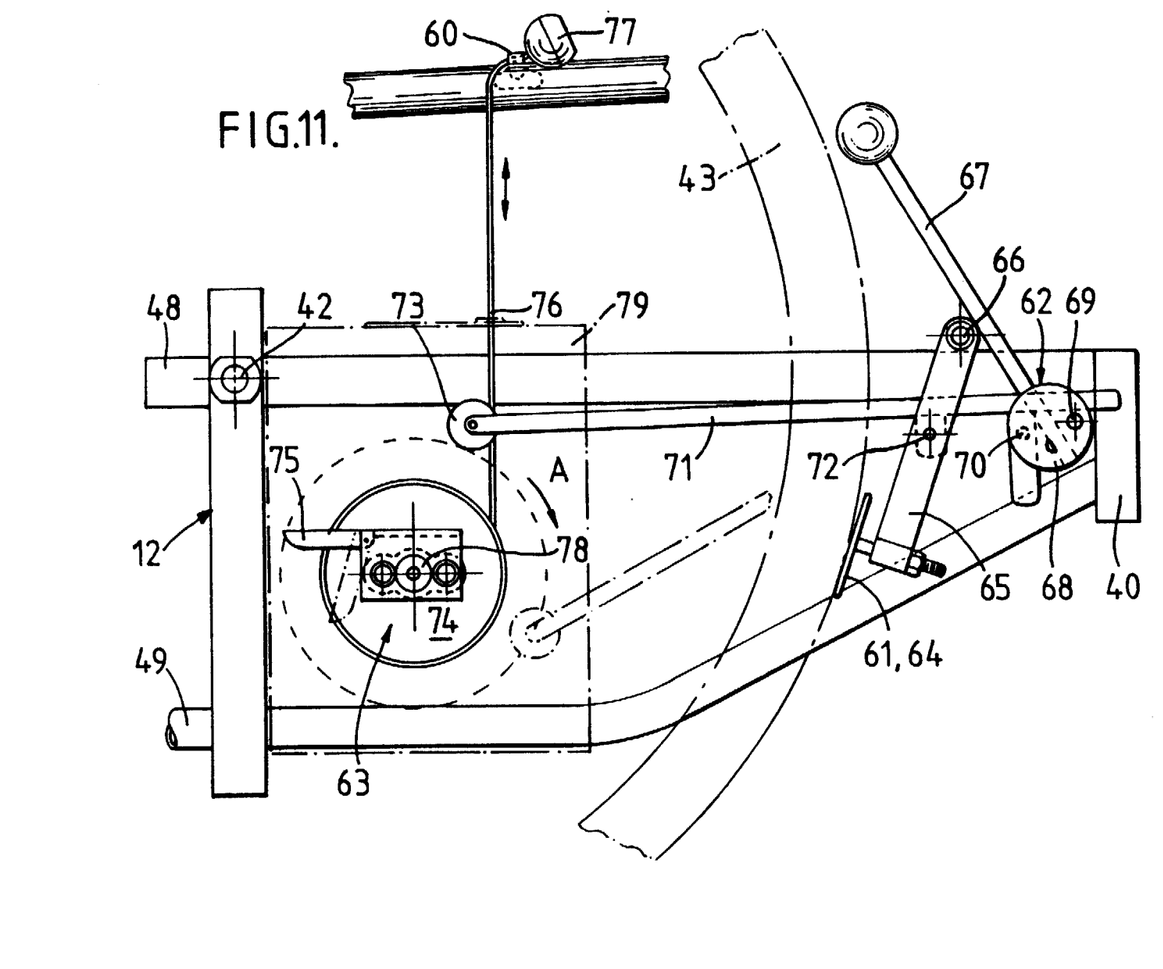
FIG. 11 is an elevational view of the general arrangement of braking apparatus on part of a wheelchair chassis of the invention.
Figure 12:
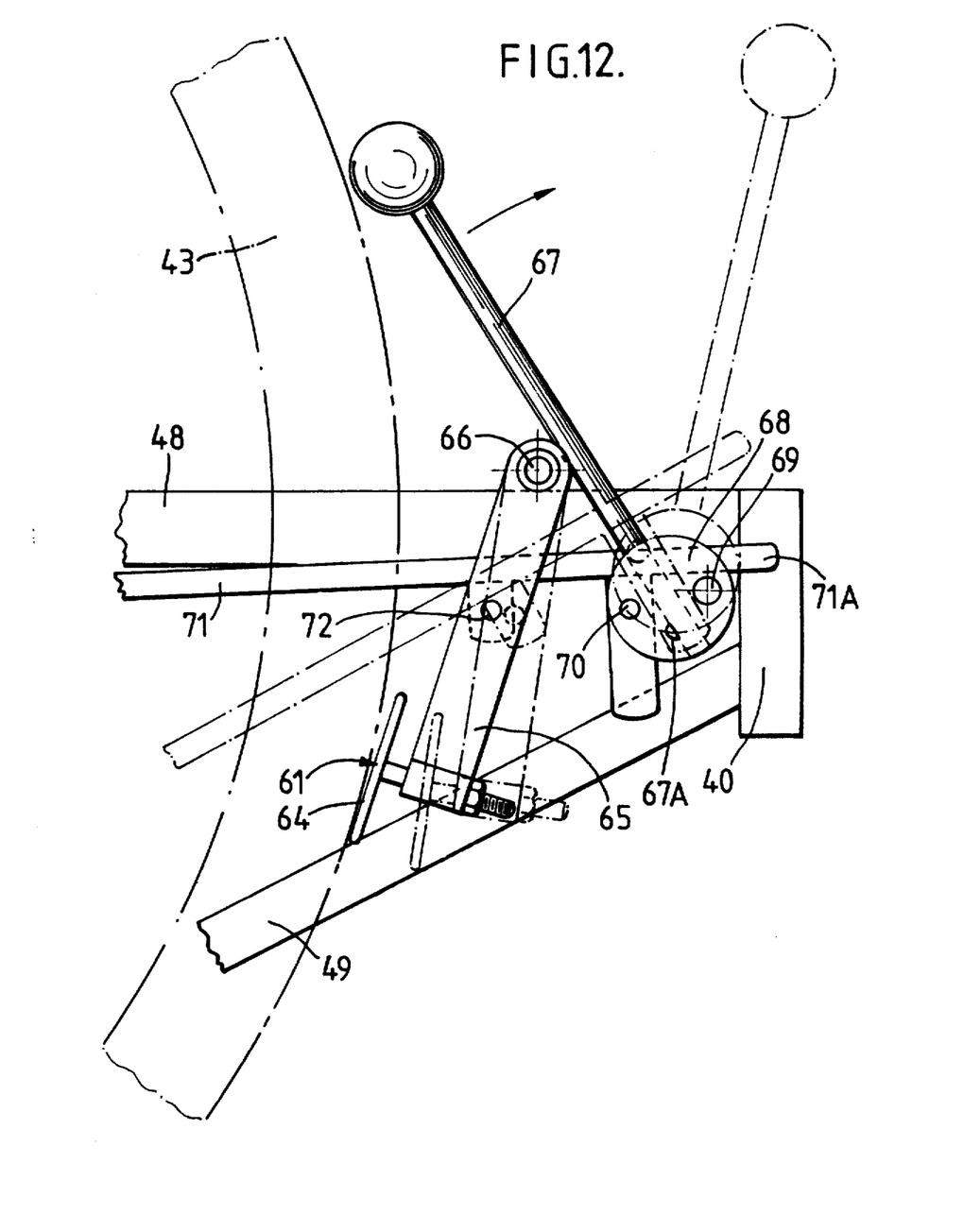
FIG. 12 is a fragmentary view showing an enlarged detail of the braking mechanism for the apparatus of the invention.

Referring to FIGS. 11 and 12, the braking apparatus comprises a pair of wheel brakes 61, a manually actuable control mechanism 62 and an automatic actuating mechanism 63.

The brakes 61 include a braking member 64, for each wheel 43, adjustably mounted on a respective arm 65, which arms are pivotally mounted on the portion 48 and are linked by a shaft 69 and levers 71 to move in unison about a brake axis 66 between a "brakes-on" position (FIG. 11) and a "brakes-off" position shown in broken lines in FIG. 12, as hereinafter described.

The control mechanism 62 includes an operating lever 67 releasably connected to a control member 68 which is mounted on a shaft 69 carried by the frame so as to be swingable about a control axis co-axial with the shaft to move an actuating pivot 70 about said control axis; and includes a brake actuating lever 71 which is supported by and connects said pivot 70 and a brake pivot 72 mounted on one arm 65 so as to move the brakes between the "on" and "off" positions as the lever 67 is moved between the positions shown in full and broken lines in FIG. 12. The pivot axes are arranged so that as the brakes near the "on" position, the actuating pivot 70 passes directly downwards through the common plane of the control axis and the parallel axis of the brake pivot 72, to give an "over-center" action for holding the brakes on and an increasing mechanical advantage as the pivot 70 approaches the common plane from the off position.

Instead of, or in addition to, the members 68 being linked directly by the shaft 69 or an equivalent torque tube co-axial with the control axis, the control mechanism 62 may be substantially duplicated on the other side of the chassis and connected to the duplicate by a shaft or torque tube which is co-axial with the brake axis 66 and mechanically and directly connects the two arms 65 to move in unison. The lever 67 may be releasably secure in a socket e.g. by means of a locking pin 67A as shown in FIG. 14, or a duplicate lever may be provided.

The lever 71, or one thereof, is extended rearwards to carry a roller 73.

The automatic actuating mechanism 63 includes a hub 78 mounted on the frame, a drum 74 rotatably carried by the hub, a winding spring (not shown) acting between the hub and drum to urge the latter in a clockwise direction indicated by arrow A in FIG. 11; a pawl 75 pivotally mounted on the drum 74 for movement between an extended position (full lines) and a retracted position (broken lines) as shown in FIG. 11 (the pawl may be spring biased towards the extended position); and a cord 76 which is wound onto the drum and has an end knob or connector 77 releasably secured to the hook 60 so that as the latter is raised cord is drawn from the drum causing the latter to turn anticlockwise and thereby move the pawl to engage the roller and lift the rear end of the lever 71 from the "off" to the "on" position.

In this embodiment the arrangement of the braking apparatus, and in particular the relevant axes of parts 72, 69 and 70, is such that when the lever 67 is swung rearwards manually or by the hook 60 being raised sufficiently to fully apply the brakes, the latter remain "on" when and after the hook 60 is lowered, until such time as the lever 67 is manually displaced to the "off" position, in which it is retained by the bias spring 65A. That is to say, the axis 70 passes beyond a line between the axes 72 and 69 as the lever is swung rearwards to a limit provided by the end 71A of the lever 71 being stopped by abutting the shaft 69.

The ratio of lift to drum rotation is such that only a relatively small amount of lift, e.g. 10 to 15 cm of a possible 30 to 50 cm of maximum lift, is required to bring the lever automatically to the stable fully on position so that further lifting carries the pawl anticlockwise past and below the raised roller. Upon lowering of the hook 60, the spring-driven rotation of the drum causes the cord to be rewound, and the pawl swings to the retracted position as it strikes and passes the roller so as not to hinder winding of the cord. However, the apparatus could be arranged so that the brakes are released as the hook 60 is lowered, e.g. by arranging the winding rate to drum rotation ratio and the pawl location relative to the maximum elevation of the hook 60 to be such that at maximum lift the pawl holds the lever, short of the fully "on" position, in a position in which the brakes are applied but the actuating pivot 70 is just above said common plane.

The mechanism 63 is enclosed in a cover 79 which acts as a stop abutted by the knobs 77 when the knob is disengaged from the hook 60. In use, the lifting device can be employed in the condition shown in FIG. 10 on its own, e.g. in a bath or on a hard surface to which the suckers or suction cups 31 can adhere, and for this reason the backrest 17 is preferentially attached to the platform 24 and not to the carrier frame 11. To this end the compressor and battery unit 13 is provided with a carrying handle and the pipe 15 and remote hand-control unit 13A are detachable from the unit 13 and from the lifting device and armrest.

Figure 10:
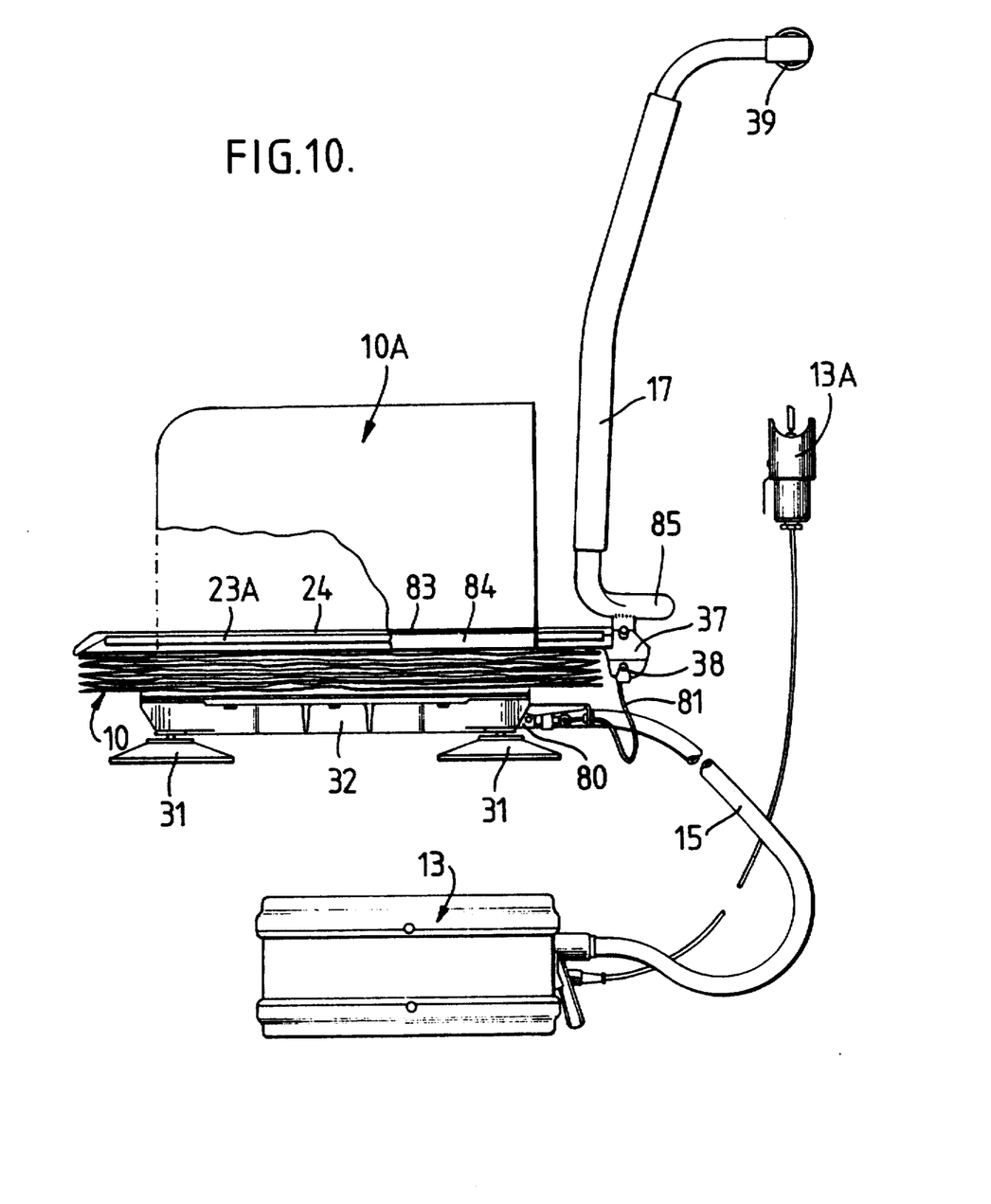
FIG. 10 is an elevational view showing the lifting device and a self-powered portable compressor unit detached from the apparatus for independant use.

FIG. 10 also shows a pressure relief valve 80, which releases pressure from the pipe and lifting device when a predetermined pressure is exceeded, which pressure relief valve can be actuated mechanically by a pull-cord 81 which is attached to the rear of the platform by a cleat 82 to cause compressed air to be released when a predetermined height of lift of the platform has been reached. The cord is preferably anchored by the cleat at a length which prevents the lifting device being driven to its fullest extent of lift, by a few centimeters, but the cord can be secured to the cleat in positions giving a lesser limit to the lift height, e.g. where the overall height of the platform is to be limited for safety reasons where an exceptionally heavy person or a person whose movements are violently uncontrollable occupies the platform or the seat. The flank panel 10A has a hinge 83 which connects a mounting 84 to the panel, the mounting 84 being slidably engageable upon the formation 23A to support the panel upon the platform.

Figure 9:
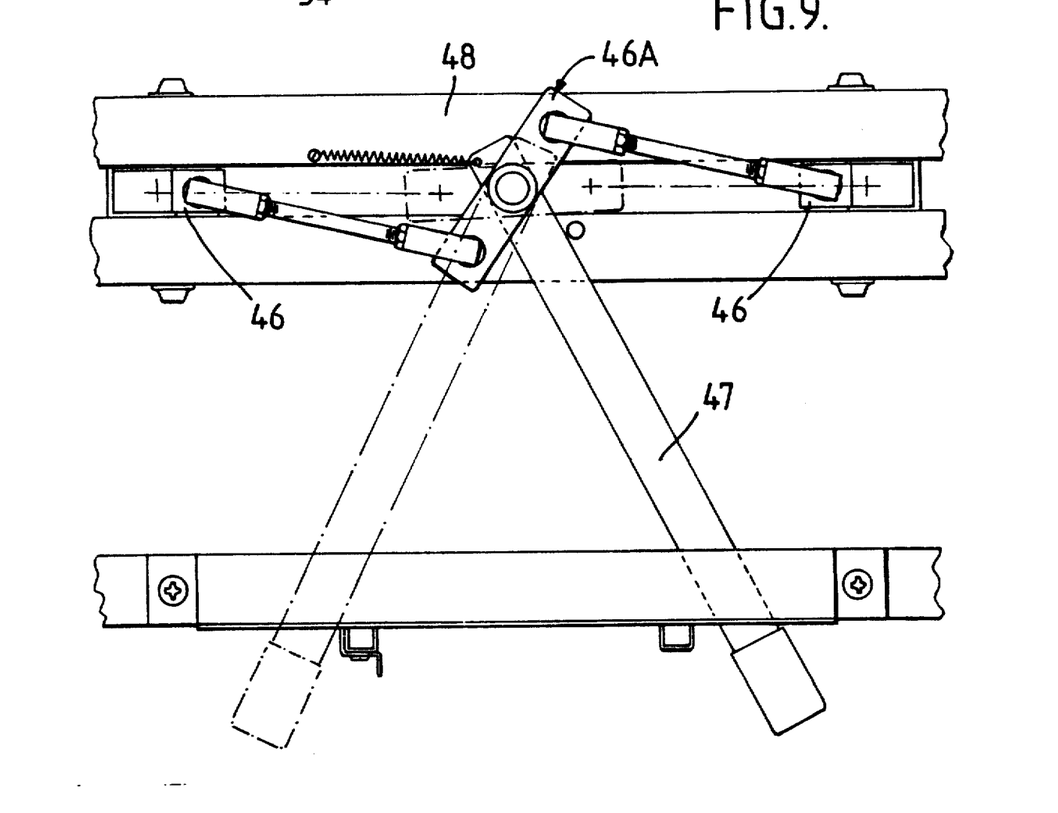
FIG. 9 is a fragmentary view of the underside of part of the chassis and a locking mechanism thereon.

To reassemble the lifting device into the wheel chair apparatus, the flank panel is removed, the lifting device is deflated to the minimal condition in which it is shown in FIG. 10, the base 32 is placed upon the chassis so as to rest against the abutments 45A in positions in which the centers of the suckers or suction cup 31 rest upon the pads 45, and then the hand lever 47 is swung from the position shown in full lines in FIG. 9 to the position shown in chain broken lines to pass a locking catch 84 which retains the lever 47 in the latter position. The movement of the lever 47 swings the upper ends of the locking levers 46 towards each other to engage over the base 32 to secure the base to the chassis.

Figure 8:
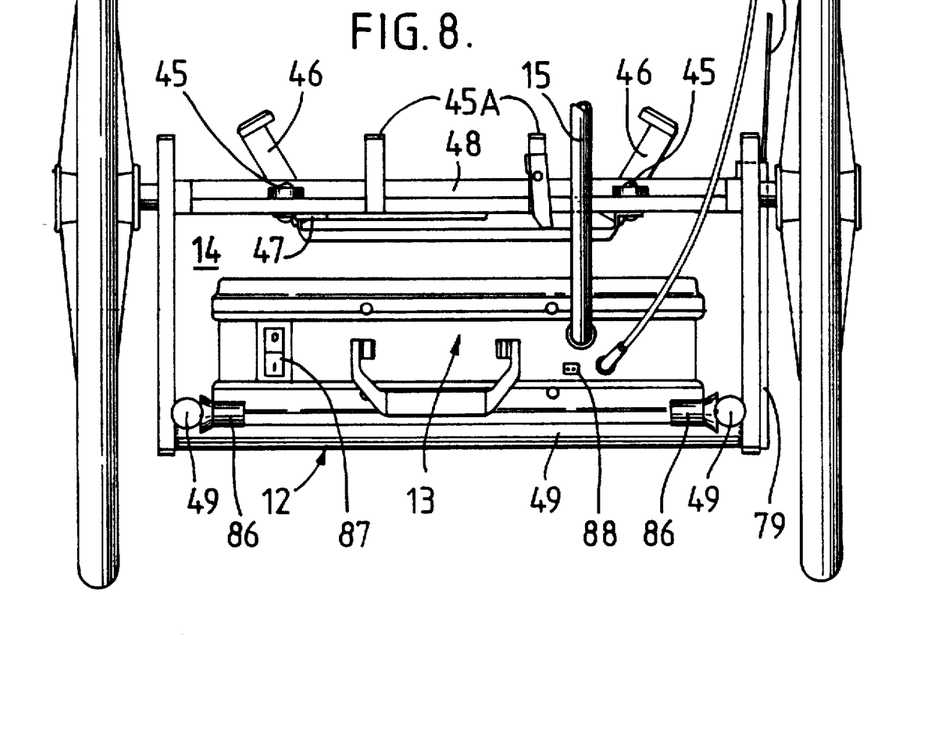
FIG. 8 is a rear elevational view of the chassis with a lifting device detached.

Thereafter the carrier frame 11 is held in front of the platform and then slid rearwards so that the front ends of the formations 23A enter into the channels 23 as the carrier frame is pushed towards the rear of the platform 24. When the rearward movement of the carrier frame is halted by the front edge of the platform abutting the stops 25, then the spring clips 26 are swung to engage the rear of the platform. The cord 76 is then drawn upwards from the cover 79 and is looped onto the hook 60 so that the knob prevents retraction of the cord from the frame 11. The carrier frame may be applied to the platform with the legrest and armrest in situ if desired, but it is preferred to insert the carrier frame without the seat in position. Once the carrier frame has been fitted to the platform the seat is laid on the panel or seat member and is attached or held in position by a velcro strip or a press-stud fixing, not shown. If desired a restraining belt may be fitted to the lower frame run 85 of the backrest to retain an occupant on the seat. The handset unit 13A is then clipped to the armrest mounting 59 and the unit 13 is inserted into the compartment or space 14. To facilitate insertion of the unit into the chassis rollers 86 may be provided on a rear chassis member as shown in FIG. 8.

It will be readily appreciated that the wheelchair apparatus gives a relatively large maximum to minimum height ratio for the seat while retaining all the attributes of a conventional wheelchair. Furthermore the lifting device may be used at only a minimal lift condition in which the device is pressurized partially by the compressor unit, which may then be switched off, so as to serve as an air suspension for the seat while the wheelchair is in motion. Also, the apparatus provides increased utility by allowing the lift operating device to be separated from the chassis and carrier frames for use as a bath lift, and in the disassembled condition, especially with the large main wheels removed, the whole apparatus is easily stowed in the luggage space of an ordinary car, and the individual units, being relatively small, are light and easily handled by a person of only moderate strength.

Of great importance, in view of the relatively enormous degree of lift which can be provided, the automatic brake ensures that the apparatus is only mobile while it is in a safe i.e. low lift, condition, and the apparatus provides facilities for a disabled occupant to return the apparatus from a high lift condition to a low lift condition for mobility without requiring, in most cases, assistance by another person.

The battery is preferably of a rechargeable form and the unit preferably includes a charging socket 88 by means of which the battery can be recharged and compressor operated from an external electricity source.

To prevent excessive current drain upon the battery the unit 13 preferably includes an on/off switch 87 (FIG. 8).

The invention further provides apparatus including any novel matter or part or combination thereof disclosed herein; is not confined to details of the illustrated example; and includes mechanical and functional equivalents of the items, parts and features of the apparatus disclosed.

What I claim is:

1. A wheelchair assembly comprising:
   (a) four manually separable units including a chassis having wheels, a lifting device releasably mounted on said chassis, seat means releasably mounted on said lifting device, and a power unit removably stowed on said chassis, wherein the power unit is separable from the lifting device,
   (b) said lifting device including a base releasably securable to said chassis by a manually actuable locking mechanism, and a platform supported above said base by internally stabilized lifting means disposed between the platform and the base for raising and lowering the platform relative to the base,
   (c) the seating means including a carrier frame releasably secured by manually actuable retaining means to said platform,
   (d) the power unit and lifting device are operatively connected by manually detachable connecting means, and
   (e) said manually actuable locking mechanism, said manually actuable retaining means and said manually detachable connecting means are manually actuable to enable each of the lifting device and power units to be lifted from the assembly and to be reconnected together by the manually detachable connecting means for use as a bath lift apparatus without the chassis and seating means.

2. An assembly as defined in claim 1 wherein
said manually actuable locking mechanism is disposed on the chassis to hold down said base of the lifting device onto mountings located on the chassis, and
the chassis includes stowage for the power unit below said mountings.

3. An assembly as defined in claim 1 wherein
the power unit includes an air pump unit to supply air under pressure to the lifting device, and an electrical storage cell accommodated in a carrying case so as to be portable for use with the lifting device when the latter is removed from the chassis and said carrier frame,
said chassis has an upper frame portion including mountings for detachable main wheels, and
said chassis includes stowage for said power unit below said upper frame portion.

4. An assembly as defined in claim 1 wherein
the chassis includes braking apparatus comprising at least one wheel brake actuable via a manually actuable control mechanism, and an automatic actuating mechanism arranged to ensure that the wheel brake is applied while the seat means is being raised irrespective of any operation or attempted operation of the manually actuable control mechanism.

5. An assembly as defined in claim 4 wherein
the automatic actuating mechanism is arranged to be uncoupled, negated or released by an attendant or other operative, to permit the assembly to be moved while the seat means is elevated.

6. An assembly as defined in claim 4 wherein
the automatic actuating mechanism acts via the manually actuable brake control mechanism and includes a member releasably connected to a vertically movable part of the seat means or lifting device,
said releasably connected member is flexible and mounted on a winding drum for retraction by the drum when the seat is lowered or when the member is disconnected from the seat or lifting device, and
the drum is mounted on the chassis and carries a pawl which moves to engage a wheel brake operating member as said flexible member is drawn from the drum.

7. A combined wheelchair and bathlift assembly in which (a) the wheelchair comprises a chassis having wheels, a lifting device on said chassis, seating means releasably mounted on said lifting device, and a power unit separable from the lifting device,
(b) said lifting device including a base securable by a manually actuable locking mechanism to said chassis, and a platform supported above said base by stabilized lifting means disposed between the platform and the base for raising and lowering the platform relative to the base,
(c) the seating means including a backrest mounted on a rear end of the platform of the lifting device, and a carrier frame releasably mounted on the platform for supporting armrests and legrest means,
(d) the base including suction cup means to adhere to the bottom of a bath, and the carrier frame and wheeled chassis are separable from the lifting device so that the lifting device can be placed intact in a bath with the backrest in situ to serve as a bathlift,
(e) the power unit is stowable in and liftable from the wheeled chassis and is operatively releasably connectable to the lifting device, both when the lifting device forms part of the wheelchair and when the lifting device is separated from the chassis and carrier frame, by manually detachable connecting means, for operating the lifting device.

8. An assembly as defined in claim 7 wherein
the seating means includes a seat cushion supported on the carrier frame above said platform, and
the carrier frame includes manually actuable retaining means releasably engageable with the platform to retain the carrier frame on the platform.

9. An assembly as defined in claim 8 wherein
said carrier frame slidably engages formations on lateral margins of the platform of the device, and
at least one flank panel is locatable on either of said formations, when the carrier frame is removed, to provide a hinged extension of the platform.

10. As assembly as defined in claim 7 wherein
said manually actuable locking mechanism is disposed on the chassis to hold down said base of the lifting device on to mountings located on the chassis, and
the chassis includes stowage for the power unit below said mountings.

11. An assembly as defined in claim 7 wherein
the power unit includes an air pump unit to supply air under pressure to the lifting device, and an electrical storage cell accommodated in a carrying case so as to be portable for use with the lifting device when the latter is removed from the chassis and said carrier frame, and
said chassis has an upper frame portion including mountings for detachable main wheels and stowage for said power unit below said upper frame portion.

* * * * *